United States Patent
Kobayashi et al.

[11] Patent Number: 5,936,931
[45] Date of Patent: Aug. 10, 1999

[54] DISC CLAMPING DEVICE

[75] Inventors: Yasushi Kobayashi; Hiroki Koyanagi; Toshiyuki Saito, all of Tomakomai, Japan

[73] Assignee: Nippon Light Metal Company Ltd., Tokyo, Japan

[21] Appl. No.: 08/862,535

[22] Filed: May 23, 1997

[30] Foreign Application Priority Data

May 30, 1996 [JP] Japan ................................. 8-136477

[51] Int. Cl.$^6$ .............................. G11B 17/04; B66C 1/42
[52] U.S. Cl. ...................................... 369/178; 294/103.1
[58] Field of Search ................. 269/32, 48; 204/298.15; 369/270, 178; 294/103.1

[56] References Cited

U.S. PATENT DOCUMENTS 5,201,501 4/1993 Fassler ...................................... 269/32

FOREIGN PATENT DOCUMENTS 64-37971 3/1989 Japan .
3-106518 11/1991 Japan .

OTHER PUBLICATIONS

Edmund Scientific, 1996 Optics & Optical Components Catalog, p. 98.

Primary Examiner—David L. Ometz
Assistant Examiner—Angel Castro
Attorney, Agent, or Firm—Heslin & Rothenberg, P.C.

[57] ABSTRACT

A disc clamping device which includes at least one main body piece fixed to an end of a cylindrical main body and abutted against the outer peripheral edge of a disc, a plunger slidingly disposed in the cylindrical main body, a shaft fitted to an end of the plunger and an extreme end piece attached to an end of the shaft and pressed against the peripheral edge of the center hole of the disc, is further provided with stop means for positioning the extreme end piece on the shaft according to a diameter of the disc and turning prevention means screwed to the other end of the plunger so as to prevent the turning of the shaft. With this arrangement, the disc clamping device can cope with discs having various diameters and further the occurrence of warp and scratch of the disc can be prevented.

5 Claims, 2 Drawing Sheets

DISC CLAMPING DEVICE

BACKGROUND OF THE INVENTION

1. Field of the Invention

The present invention relates to a disc clamping device having a center hole, and more specifically, to a disc clamping device for clamping ultra-precision disc to which information is magnetically or optically recorded for inspection or movement.

2. Description of the Prior Art

In an ultra-precision disc to which information is magnetically or optically recorded, information recorded to a recording medium on a disc surface is read by a scanning head while the disc is rotated about the opening of a center hole. The interval between the disc surface and the scanning head is made narrower than several micron meters due to the recent increase of recording density. That is, even slight unevenness is not permitted on the disc surface and further discs having various diameters are made to cope with a wide variety of appliances. In the manufacture of discs, although the flatness and unevenness of the surface of them are inspected after each manufacturing step or after a final manufacturing step by clamping the discs, the application of even slight stress to the discs is not permitted in the inspection.

From the circumstances mentioned above, an inspection jig has been devised in a conventional disc clamping device. Japanese Unexamined Utility Model Publication No. 64-37971, for example, discloses a handling jig comprising at least one V-shaped groove part (main body piece) which is fixed to an end of a cylindrical shaft main body and abutted against the outer peripheral edge of a disc, a plunger slidingly disposed in the shaft main body, a shaft fitted to an end of the plunger, a V-shaped groove part (extreme end piece) attached to an end of the shaft and pressed against the peripheral edge of the center hole of the disc and a spring accommodated in the shaft main body and urging the V-shaped groove part (extreme end piece) to the V-shaped groove part (main body piece) side by the pushing motion of the plunger.

Japanese Unexamined Utility Model Publication No. 3-106518 discloses a jig comprising a roller having one V-shaped groove for clamping the center opening edge of a disc, a roller having two V-shaped grooves for clamping the outer peripheral edge of the disc and a clamping part for coupling both the rollers.

The former jig cannot cope with discs having various diameters because the V-shaped groove part (extreme end piece) which is attached to the extreme end of the shaft is fixed. In addition, since there is a possibility that the shaft turns, when a disc is clamped in the turnable state, there is a possibility that the disc is warped or scratched. The latter jig cannot also cope with discs having various diameters because the rollers are fixed to the clamping part. Further, there is a possibility that the clamping part turns.

SUMMARY OF THE INVENTION

An object of the present invention is to provide a disc clamping device which can cope with discs having various diameters and further does not warp and scratch the discs.

To achieve the above object, a disc clamping device according to the present invention comprises at least one main body piece fixed to an end of a cylindrical main body and abutted against the outer peripheral edge of a disc; a plunger sliding in the cylindrical main body; a shaft fitted to an end of the plunger; an extreme end piece attached to an end of the shaft and pressed against the peripheral edge of the center hole of the disc; an elastic member accommodated in the cylindrical main body for urging the extreme end piece to the respective main body pieces sides by the pushing motion of the plunger; stop means for positioning the extreme end piece on the shaft according to a diameter of the disc; and turning prevention means for preventing the turning of the shaft.

A disc clamping device according to another aspect of the invention of this application comprises at least one main body piece abutted against the outer peripheral edge of a disc having a center hole; and an extreme end piece attached to the extreme end of a shaft fitted to a plunger and pressed against the peripheral edge of the center hole, wherein the extreme end piece is positioned on the shaft by stop means according to a diameter of the disc as well as the disc clamping device is further provided with turning prevention means.

According to these inventions, since the extreme end piece is positioned to an end of the shaft according to a diameter of the disc by the stop means, and the turning of the shaft is prevented by the turning prevention means, discs having various diameters can be clamped as well as the turning of the extreme end piece is prevented to thereby prevent the occurrence of warp and scratch of the discs.

It is preferable that the stop means is a set screw abutted against the shaft by being screwed to the extreme end piece inserted into the shaft and the turning prevention means is a shaft set screw screwed to the other end of the plunger and slid and guided in an axial direction.

When the above disc clamping devices comprise a three points support structure using two main body pieces and one extreme end piece, they can be arranged simple in structure and firmly clamp the disc.

The above disc clamping devices are preferably arranged such that the abutting portion of each of the main body piece and the extreme end piece which is abutted against the disc is machined to a conical shape from both the upper and lower directions thereof and a recessed portion is formed thereto. Since the recessed portion permits the disc to be held in a point contact state, there is less possibility of deformation and the like.

Further, the disc may be arranged as a magnetic disc.

DETAILED DESCRIPTION OF PREFERRED EMBODIMENT

Figure 1:
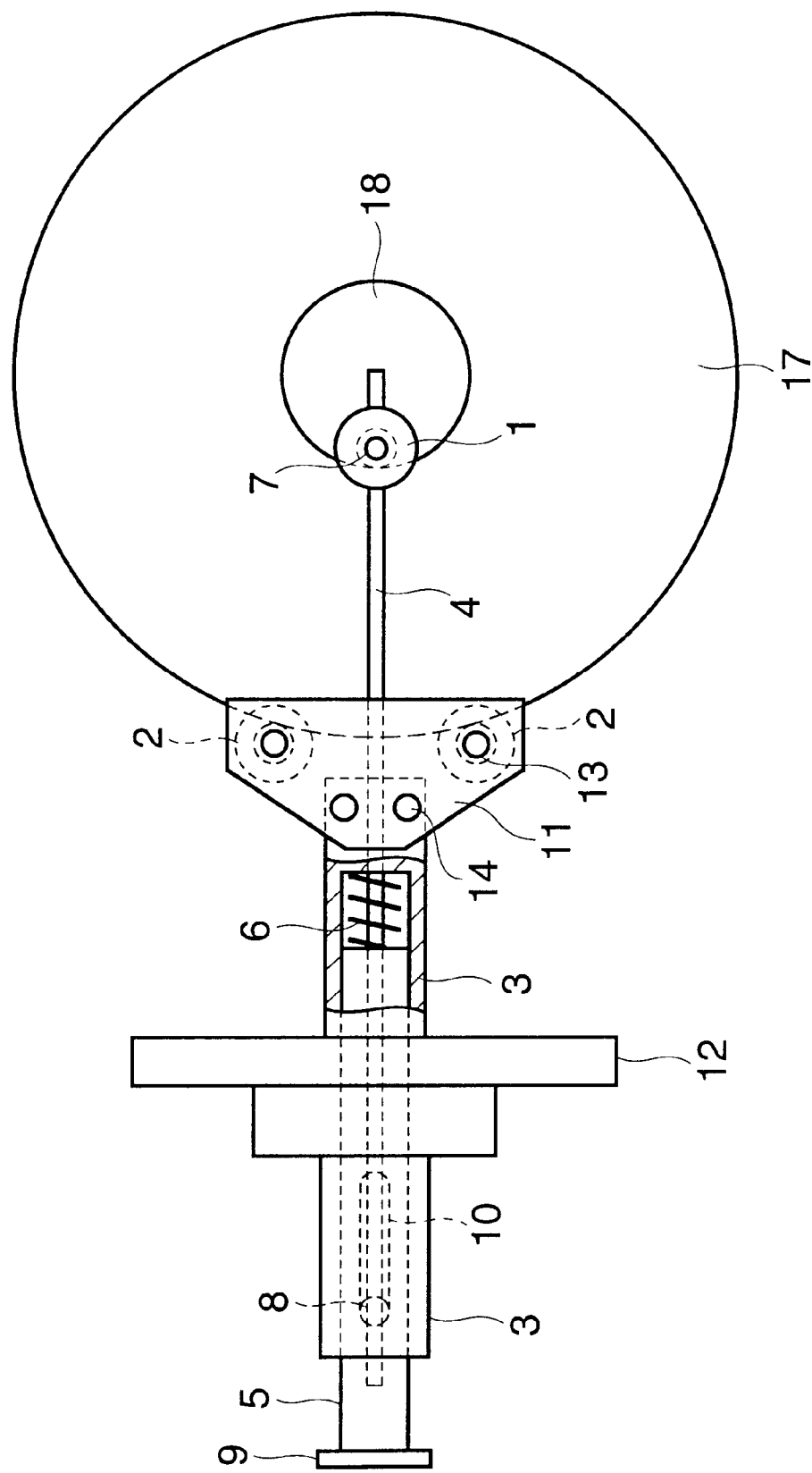
FIG. 1 is a plan view showing an embodiment of the present invention.
Figure 2:
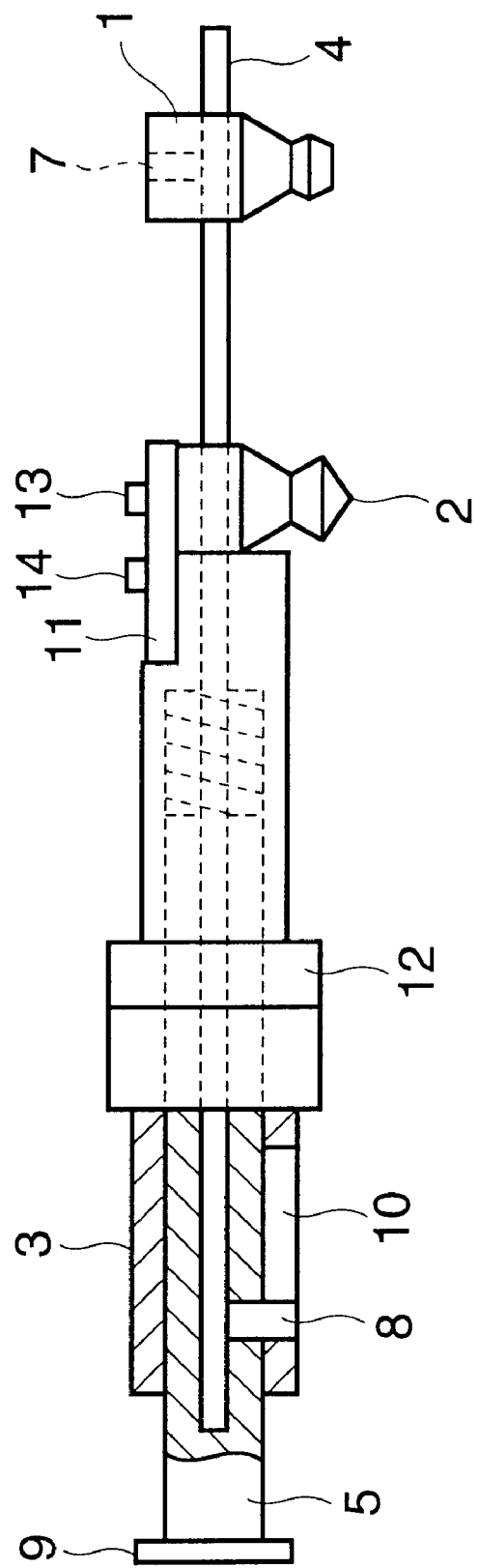
FIG. 2 is a side elevational view of FIG. 1.

An embodiment of the present invention will be described with reference to FIG. 1 and FIG. 2. As shown in FIG. 1 and FIG. 2, a disc clamping device, which includes a trapezoid arm 11 screwed to an end of a cylindrical main body 3 by a screw, at least one main body piece 2 fixed to the arm 11 by mounting screws 13 and abutted against the outer peripheral edge of a disc 17, a plunger 5 slidingly disposed in the cylindrical main body 3, a shaft 4 fitted to the plunger 5 and also associated with the plunger 5, an extreme end piece 1 attached an end of the shaft 4 and pressed against the peripheral edge of the center hole 18 of the disc 17 and an elastic body (chuck spring) 6 accommodated in the cylindrical main body 3 for urging the extreme end piece 1 to the side of the main body pieces 2 when the plunger is pushed, is additionally provided with stop means 7 for positioning the extreme end piece 1 on the shaft 4 according to a diameter of the disc 17 and turning prevention means 8 screwed to the other end of the plunger 5 so as to prevent the shaft 4 from turning clockwise or counterclockwise to a disc surface.

The stop means is a set screw 7 which is screwed to the extreme end piece 1 inserted into the shaft 4 and abutted against the surface of the shaft 4 so as to stop the extreme end piece 1, and the turning prevention means is a shaft set screw 8 which is screwed to the other end of the plunger 5 and slidingly guided in an axial direction by a slot 10 defined to the other end of the cylindrical main body 3.

That is, the cylindrical main body 3 is arranged such that a predetermined length of a shaft hole is defined at the one end thereof so that the shaft 4 is slidingly inserted thereinto and a flat surface is formed on the upper surface at the one end side thereof to permit the arm 11 to be screwed thereto by screws 14. After the arm 11 is screwed to the flat surface, each of main body pieces 2 is mounted to each of both the ends of the arm 11 by the mounting screw 13. An internal hole is defined to the other end side of the shaft hole to permit the plunger 5 to be slidingly inserted thereinto and a fixing member 12 is attached at approximately the middle of the cylindrical main body 3 so that the cylindrical main body 3 can be fixed by fingers put on the fixing member 12 or fixed to an reversing table or the like through the fixing member 12. Further, defined to the other end of the cylindrical main body 3 is the slot 10 which has a predetermined length and a width for permitting the shaft set screw 8 to be inserted thereinto so that the shaft 4 on which the extreme end piece 1 is stopped in correspondence to the disc 17 having various diameters can be guided to the one end side of the cylindrical main body 3 while preventing the turning of the shaft 3.

The plunger 5 has a flange 9 disposed to the other end thereof and pushed by hand or a not shown push mechanism and the shaft 4 of small diameter is fitted to the one end side of the plunger 5 in a center axis direction. After the chuck spring 6 having a predetermined spring constant is accommodated between the one end surface of the plunger 5 and the bottom surface of the internal hole of the cylindrical main body 3, the flange 9 projects from the other end surface of the cylindrical main body 3 a distance longer than the length of the slot 10. Further, a screw hole is machined so that the shaft set screw 8 can be screwed from the other end of the slot 10 in a state that the chuck spring 6 is accommodated. Note, when the shaft 4 is detachably inserted in the center axis direction, there is an advantage that the turning of the shaft 4 is prevented by screwing the shaft set screw 8 so that it is abutted against the outside surface of the shaft 4 as well as the shaft 4 can be replaced with other shaft having a different length according to a diameter of the disc 17.

The shaft 4 is fitted to the one end side of the plunger 5, has a length corresponding to the disc 17 having various diameters and is pushed to the one end side by the plunger 5. The extreme end piece 1 is stopped in such a manner that after the extreme end piece 1 is inserted into the one end, the set screw 7 is screwed to approximately the center of the extreme end piece 1 until it is abutted against the surface of the shaft 4. After the extreme end piece 1 is pushed to the one end side together with the shaft 4, it is slightly returned to the other end side and pressed against the peripheral edge of the center hole 18 of the disc 17. Thus, it is not necessary to position the extreme end piece 1 each time the disc 17 has a different diameter and it suffices only to position it each time the diameter of the disc 17 changes in a certain range. Each of the portions of the extreme end piece 1 and the main body pieces 2 which are abutted against the peripheral edge of the disc 17 is machined to a conical shape from an upper side and a lower side so as to be formed to a recessed portion so that it is abutted against the disc 17 through a point. The respective members except the shaft, the chuck spring and the screws are composed of a synthetic resin or the like to reduce their weights.

Next, operation of the embodiment will be described. First, the cylindrical main body 3 is fixed by the member 12. The extreme end piece 1 is inserted into the one end of the shaft 4 according to the diameter of the disc 17 and positioned on the shaft 4 by screwing the set screw 7. When the shaft set screw 8 is positioned to the other end of the plunger 5, the extreme end of the shaft set screw 8 is inserted into the slot 10 of the cylindrical main body 3. When the main body pieces 2 are abutted against the outer peripheral edge of the disc 17, the flange 9 of the plunger 5 is pushed toward the one end side by hand or the push mechanism. With this operation, the chuck spring 6 is compressed by the one end surface of the plunger 5 and the reaction force thereof causes the extreme end piece 1 to be pressed against the peripheral edge of the center hole 18 of the disc 17 while the shaft 4 returns to the other end side. At the time, since the extreme end of the shaft set screw 8 is slid and guided in the axial direction of the slot 10 of the cylindrical main body 3, the turning of the shaft 4 is prevented. Thus, the clockwise or counterclockwise turning of the extreme end piece 1 to a disc surface is also necessarily prevented. The disc 17 is clamped between the main body pieces 2 and the extreme end piece 1 as described above and one of the surfaces of the disc is inspected in this state and then the other surface thereof is inspected by reversing the disc 17.

According to the embodiment, since the extreme end piece is previously positioned at the one end of the shaft by the stop means in correspondence to the diameter of the disc, discs having various diameters can be easily clamped by a simple mechanism without touching them with hand and further the turning of the shaft can be prevented at the other end thereof by the turning prevention means, by which the turning of the extreme end piece with respect to the disc surface is also prevented. As a result, the occurrence of warp and scratch of the disc can be prevented, an inspection time is shortened and an inspection accuracy is enhanced, whereby the quality of the disc is improved.

According to the present invention, since the extreme end piece is positioned on the shaft and the turning of the shaft is prevented, the disc clamping device can cope with discs having various diameters as well as the occurrence of warp and scratch of the disc can be prevented. Further, since discs having various diameters can be clamped by the simple mechanism, there is an advantage that the inspection time is shortened, the inspection accuracy is enhanced, whereby the quality of the discs can be improved.

What is claimed is:

1. A disc clamping device for clamping a disc having a central hole, an outer peripheral edge and an inner peripheral edge comprising:

a cylindrical main body;

a plunger slidable in the cylindrical main body;

a shaft fitted to an end of said plunger;

at least one main body piece fixed to an end of said main body for abutting against said outer peripheral edge of said disc;

an extreme end piece adjustably positionable along the shaft for pressing against the inner peripheral edge of the disc;

an elastic member accommodated in the cylindrical main body for urging said extreme end piece in a direction towards said at least one main body piece;

stop means for securing said extreme end piece at a selected variable axial position on said shaft according to a diameter of the disc; and turning prevention means attached to said plunger for preventing said shaft from turning with respect to said cylindrical main body in order to avoid warping and scratching of a clamped disc.

2. A disc clamping device according to claim 1, wherein said stop means comprises a set screw mounted on said extreme end piece to be screwed into abutment against said shaft and said turning prevention means comprises a shaft set screw screwed to the other end of said plunger and slid and guided in an axial direction within an axially extending slot of said cylindrical main body.

3. A disc clamping device according to claim 1, comprising a three points support structure using two main body pieces and one extreme end piece.

4. A disc clamping device according to claim 1, wherein an abutting portion of each of said at least one main body piece and said extreme end piece which is abutted against the disc is machined to a conical shape from both upper and lower directions thereof and a recessed portion is formed thereto.

5. A disc clamping device according to claim 1, wherein said shaft fitted to said plunger is disposed so as to be replaced.

\* \* \* \* \*